US011132729B2

(12) United States Patent
Padmanabh et al.

(10) Patent No.: US 11,132,729 B2
(45) Date of Patent: Sep. 28, 2021

(54) SYSTEMS AND METHODS FOR BLUEPRINT-BASED CLOUD MANAGEMENT

(71) Applicant: ServiceNow, Inc., Santa Clara, CA (US)

(72) Inventors: Giri Padmanabh, Mountain View, CA (US); Brajesh Goyal, San Jose, CA (US); Utpal Thakrar, Goleta, CA (US); Ashok Madhavan, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/849,440

(22) Filed: Dec. 20, 2017

(65) Prior Publication Data

US 2018/0322558 A1    Nov. 8, 2018

Related U.S. Application Data

(63) Continuation of application No. 15/587,610, filed on May 5, 2017, now Pat. No. 10,949,903.

(51) Int. Cl.
*G06F 9/54* (2006.01)
*G06Q 30/06* (2012.01)
*H04L 29/08* (2006.01)
*G06F 9/50* (2006.01)

(52) U.S. Cl.
CPC ......... *G06Q 30/0623* (2013.01); *G06F 9/541* (2013.01); *G06F 9/547* (2013.01); *G06Q 30/0603* (2013.01); *H04L 67/34* (2013.01); *G06F 9/5072* (2013.01); *G06F 9/5077* (2013.01)

(58) Field of Classification Search
CPC .. G06Q 30/0623; G06Q 30/0601–0645; G06F 9/541; G06F 9/5077; G06F 9/547; G06F 9/5072; H04L 67/34
USPC ...................................... 705/26.61
See application file for complete search history.

(56) References Cited

U.S. PATENT DOCUMENTS

| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |

(Continued)

FOREIGN PATENT DOCUMENTS

| CA | 2401634 A1 | 8/2001 |
| WO | 2014007810 A1 | 1/2014 |
| WO | 2015034486 A1 | 3/2015 |

OTHER PUBLICATIONS

Balasubramanyam, S. R.. Cloud-based development using classic life cycle model, 2013, Springer, London, In Software Engineering Frameworks for the Cloud Computing Paradigm (pp. 101-122). (Year: 2013).*

(Continued)

*Primary Examiner* — Marissa Thein
*Assistant Examiner* — Elisa H Yang
(74) *Attorney, Agent, or Firm* — Fletcher Yoder PC

(57) ABSTRACT

Systems, methods, and media for translating requests to acquire or change goods and services by receiving a request in a service catalog. The received request is received in a format that is not suitable for a target vendor. The received request is then translated into a format suitable for the target vendor. The translated received request is then transmitted to the vendor using the translated format.

20 Claims, 11 Drawing Sheets

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 4/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,043,786 B1 | 5/2015 | Hodge et al. |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,246,765 B2 | 1/2016 | Panuganty et al. |
| 9,261,372 B2 | 2/2016 | Cline |
| 9,323,801 B2 | 4/2016 | Morozov |
| 9,363,252 B2 | 6/2016 | Meuller |
| 9,412,084 B2 | 9/2016 | Kowalski |
| 9,534,903 B2 | 1/2017 | Cline |
| 9,535,737 B2 | 1/2017 | Joy |
| 9,571,579 B2 | 2/2017 | Vijayan et al. |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,148,493 B1* | 12/2018 | Ennis, Jr. ................. G06F 9/54 |
| 2009/0210435 A1* | 8/2009 | Akiyama .......... G06F 17/30292 |
| 2014/0012627 A1 | 1/2014 | Swanson et al. |
| 2014/0039683 A1* | 2/2014 | Zimmermann ......... G06F 1/206 |
| | | 700/275 |
| 2014/0278808 A1 | 9/2014 | Iyoob et al. |
| 2014/0280966 A1* | 9/2014 | Sapuram ............ G06Q 30/0631 |
| | | 709/226 |
| 2014/0380308 A1 | 12/2014 | Hassine et al. |
| 2015/0127484 A1* | 5/2015 | Johnson ............. G06Q 30/0639 |
| | | 705/26.9 |
| 2015/0134716 A1 | 5/2015 | Nugent |
| 2015/0244597 A1 | 8/2015 | Maes et al. |
| 2015/0341230 A1* | 11/2015 | Dave ................... H04L 41/5051 |
| | | 705/7.29 |
| 2015/0373012 A1* | 12/2015 | Bartz ..................... H04L 67/36 |
| | | 726/7 |
| 2016/0072576 A1 | 3/2016 | Rad et al. |
| 2016/0205037 A1 | 7/2016 | Gupte et al. |
| 2016/0239595 A1 | 8/2016 | Maes et al. |
| 2016/0344594 A1 | 11/2016 | Flavel et al. |
| 2017/0093645 A1* | 3/2017 | Zhong .................. G06F 3/0482 |

OTHER PUBLICATIONS

Office Action of Canadian Patent Application No. 2990252 dated Oct. 30, 2018; 4 pgs.

Extended European Search Report for European Patent Application No. 17210990.2 dated Jul. 19, 2018; 8 pgs.

Examination Report for Australian Patent Application No. 2018200011 dated Oct. 12, 2018; 9 pgs.

Guidi, C., et al.; "Towards a composition-based APlaaS layer", published Apr. 2015; https://hal.inria.fr/hal-01090125/ documents>.

Australian Office Action for Australian Patent Application No. 2018200011 dated Sep. 3, 2019; 5 pgs.

Examination Report for European Patent Application No. 17210990.2 dated Aug. 10, 2020; 9 pgs.

* cited by examiner

SYSTEMS AND METHODS FOR BLUEPRINT-BASED CLOUD MANAGEMENT

CROSS REFERENCE TO RELATED APPLICATIONS

This application is a continuation of U.S. application Ser. No. 15/587,610, filed May 5, 2017 the contents of which is herein expressly incorporated by reference for all purposes.

BACKGROUND

The present disclosure relates in general to systems, methods, and apparatuses for providing cloud management.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources (e.g., configuration items) hosted in distributed computing (e.g., cloud-computing) environments may be disparately located with each having its own functions, properties, and/or permissions. Such resources may include hardware resources (e.g. computing devices, switches, etc.) and software resources (e.g. database applications).

BRIEF DESCRIPTION OF THE DRAWINGS

The description herein makes reference to the accompanying drawings, wherein like reference numerals refer to like parts throughout the several views.

DETAILED DESCRIPTION

Figure 1:
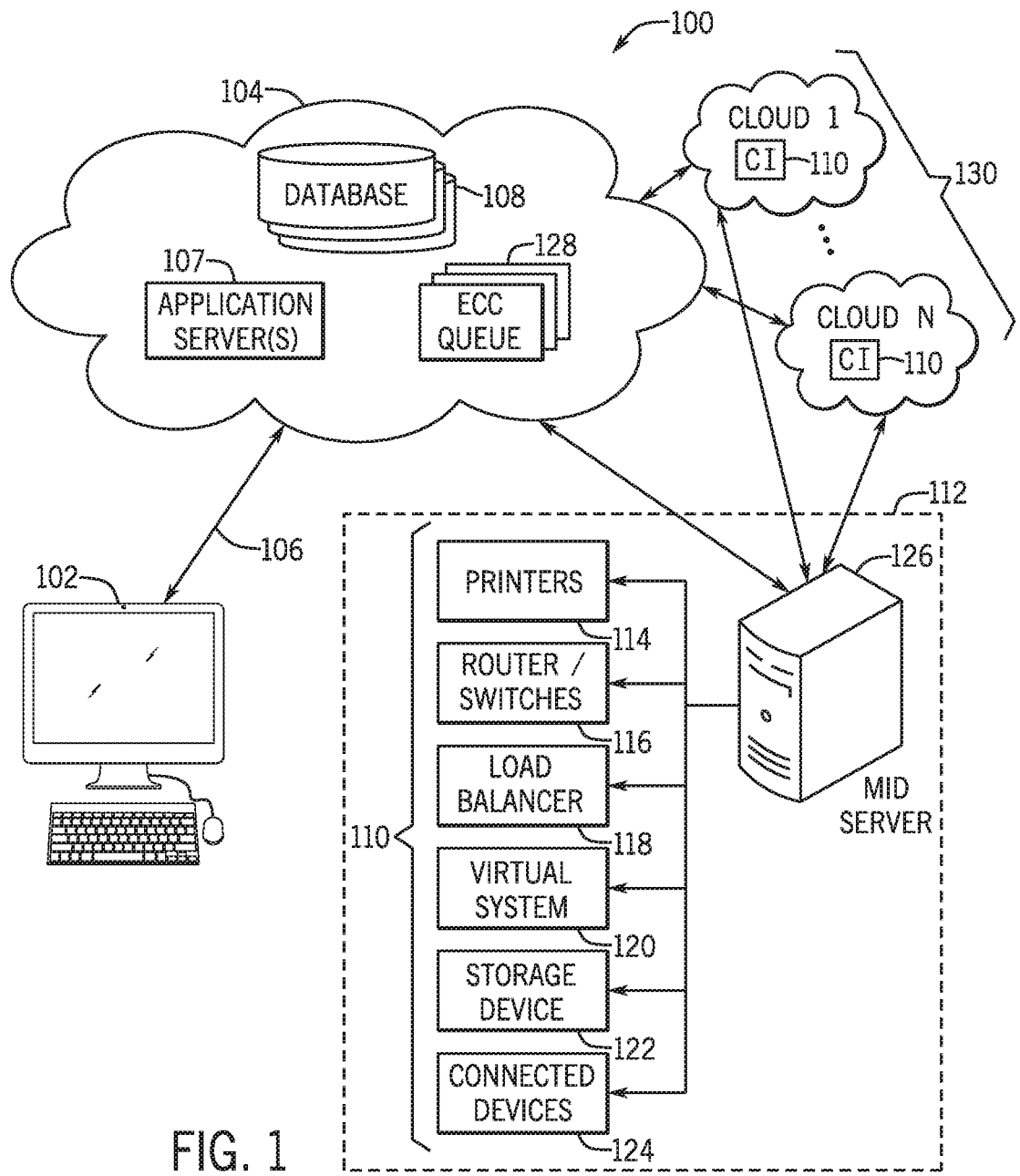
FIG. 1 is a block diagram of a distributed computing system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking configuration of these devices may become more difficult.

As the use of cloud-based platforms in the technology industry continues to evolve into more complex multi-cloud environments with a mix of private and public cloud services, Cloud Management Platforms (CMPs) are gaining importance. CMPs are becoming an important component for successfully leveraging multi-cloud environments because a CMPs include a suite of integrated tools that provide automated management of private and public clouds. CMPs facilitate the operation and automation of cloud services by eliminating the need for cloud specific interfaces and end user knowledge of cloud underpinnings.

Specifically, a CMP may include capabilities providing self-service interfaces for end user requests to a cloud service catalog of functions, tracking and managing resource lifecycles, and monitoring events and configuration information. CMPs provide an ability to build, provision, and launch application stacks. CMPs may also enable metering and billing of resource consumption in the cloud platform. CMPs may also be used to control and govern policies, automation, and role-based access control (RBAC). However, these functions may be complicated. Thus, to provide a suitable interface, automated CMP functions should integrate with IT support to simplify functions for incident and problem management, monitoring, change management (e.g., patch management, release management, configuration management, resource lifecycle management, etc.), self-service user portals, usage reporting, configurable services (e.g., events, triggers, notifications, task scheduling, etc.), service delivery management (e.g., resource service-level agreements), and other functions.

In other words, a CMP may be the central place where cloud management activities like provisioning and life cycle operations of cloud resources will take place even when the cloud services themselves may be provided from other cloud vendors. For example, the cloud vendors may include AWS, Azure, VMware, NetApp, and/or other cloud service providers. CMP may provide integration with external applications of these cloud vendors to provision, discover and do life cycle operations. For example, the CMP may create/update configuration item (CI) records in a configuration management database (CMDB).

These integrations may include providing a consistent single CMDB cloud model which can be used by CMP, discovery, event management, and/or other functions. In some embodiments, platform bindings are utilized as much as possible to create a connected experience for the users.

As discussed herein, the consistent single CMDB cloud model works with a cloud-agnostic blueprint-based system where cloud resources from one or more providers can be assembled together and/or be deployed/managed as desired. A blueprint is an operational tool that describes the nature and the characteristics of the service interaction in enough detail to verify, implement and maintain the service. An interface-and-implementation-based resource block ecosystem enables these blueprints to delegate the creation of the resources to appropriate resource blocks, when desired.

Furthermore, communication with external cloud systems (e.g., from other providers) may be established in a consistent manner using a cloud API (CAPI). CAPI provides a consistent layer and blueprints. In some embodiments, CAPI may also enable other entities to use CAPI to communicate with the clouds. CAPI may also provide a consistent way to discover resources in the cloud. For example, CAPI may be integrated with existing discovery processes for resources that are already being discovered to extend functionality in a cloud provider-agnostic manner.

By way of introduction, FIG. 1 is a block diagram of a system 100 that utilizes distributed computing framework, which may perform one or more of the techniques described herein. As illustrated in FIG. 1, a client 102 communicates with a platform 104 (e.g., a platform) over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously or separately.

The platform 104, such as a cloud service, may include any suitable number of computing devices (e.g., computers) in one or more locations that are connected together communicate using one or more networks. For instance, the platform 104 may include various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the platform 104 is enabled via a management, instrumentation, and discovery (MID) server 126 via a queue 128 (e.g., External Communications Channel Queue) and/or other queueing mechanisms. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices connected to the network 112 and return the probe results back to the platform 104. Probes may have different types and functions. For example, some probes get the names of devices of specific operating systems (e.g., Windows or Linux) while other exploration probes return disk information for those devices using the operating systems. Some probes run a post-processing script to filter the data that is sent back to the platform 104.

As a non-limiting example, the probe types available for use by the MID server 126 may include a Shazzam probe that determines what devices are active using a targeted port scan, a user-defined probe class, a multi-probe that combines probe types, and/or any combination thereof. Additionally or alternatively, the probe types may include any probe type that determines information about CIs 110.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The queue 128 may be a database table that is typically queried, updated, and inserted into by other systems. Each record in the queue 128 is a message from an instance in the platform 104 to a system (e.g., MID server 126) external to the platform 104 that connects to the platform 104 or a specific instance running in the platform 104 or a message to the instance from the external system.

The system 100 may also include/connect to one or more clouds 130 that are external to the platform 104. For example, these clouds 130 may be provided by other cloud providers and may include AWS, Azure, VMware, NetApp, and/or clouds from other cloud service providers. These clouds 130 may also include their own CIs 110 that are accessed through the clouds 130 using CAPI, as previously noted. The MID server 126 may also be used to probe the clouds 130 using a CAPI probe 132.

The platform 104 may allocate resources to users or groups of users in a multi-tenant and/or a single-tenant architecture. Allocating resources in a multi-tenant architecture includes include installations or instantiations of one or more servers, such as application servers, database servers, or any other server, or combination of servers, that can be shared amongst a group of users. For example, a web server, such as a unitary Apache installation; an application server, such as a unitary Java Virtual Machine; and a single database server catalog, such as a unitary MySQL catalog, may handle requests from multiple users. In a multi-tenant architecture, the application server, the database server, or both may distinguish between and segregate data or other information of the various customers using the system. In summary, multi-tenant architecture provides a single instance of software and all of the supporting infrastructure of the software serves multiple customers. In other words, each user shares the software application program and a database. The database and the software application program tracks who the data belongs to.

In a single-tenant architecture (which can also be referred to as a multi-instance architecture), separate web servers, application servers, database servers, or combinations thereof may be provisioned for at least some users or sub-users (e.g., sub-accounts) of those users. In the single-tenant architecture, one or more web servers are provided and dedicated to a user and/or sub-users of that user. Moreover, transactions are processed using one or more dedicated application servers, and data is stored in one or more database servers dedicated to the user or sub-users of that user. In summary, a single-tenant architecture includes a single instance serves only a single user (and its sub-users). Thus, each user has its own database and instance of the software application program. In other words, the database and the software application program are not shared between users (outside of a user's sub-users) enabling data isolations, insurance of availability of data in response to a user's demands, and scalability of databases for upgrading/expansion.

In use, a user's instance may include multiple web server instances, multiple application server instances, multiple database server instances, and/or any combination thereof. The server instances may be physically located on different physical servers and may share resources of the different physical servers with other server instances associated with other customer instances.

Although the system 100 is described as having the application servers 107, the CMDB 108, the queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
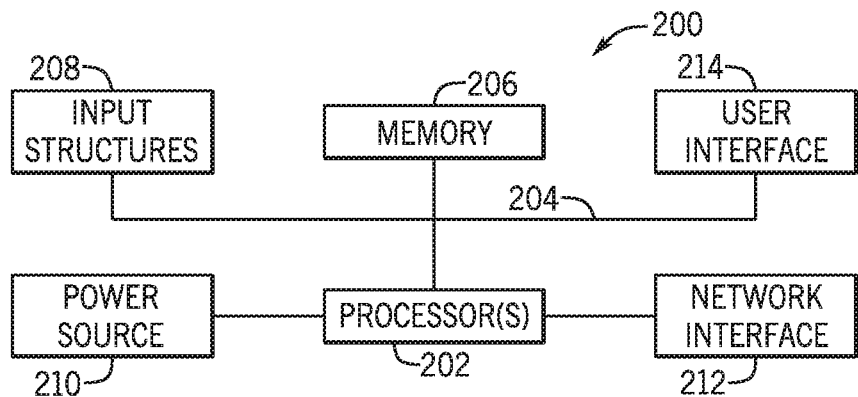
FIG. 2 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the queue 128), device running the MID server 126, and/or any of the CIs 110. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or in other accessible locations. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
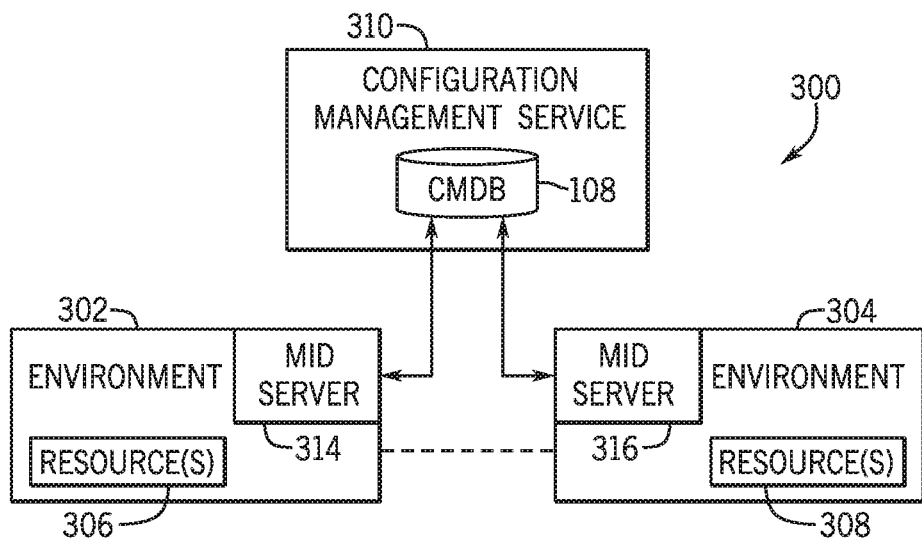
FIG. 3 is a block diagram of an electronic computing and communication system, in accordance with an embodiment.

FIG. 3 is a block diagram of an embodiment of an electronic computing and communication system 300 for discovering and/or managing connected CIs. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication therebetween. In such embodiments, the resources of disparate environments may communicate using the platform 104 (e.g., a configuration management service 310 that is a part of the platform 104 including the CMDB 108). The resources 306 and 308 may include any of the CIs 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated using the client 102, scheduled for periodic occasions (e.g., periodic discovery), or a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server 126A or 126B may be employed when the MID server may reach into multiple environments. For example, if the MID server 126A or 126B is run in the platform 104 (e.g., in the configuration management service 310), a single MID server 126A or 126B may be used to manage both environments 302 and 304. Additionally or alternatively, if the MID server 126A has access to the environment 304, the MID server 126B may be omitted.

Figure 4:
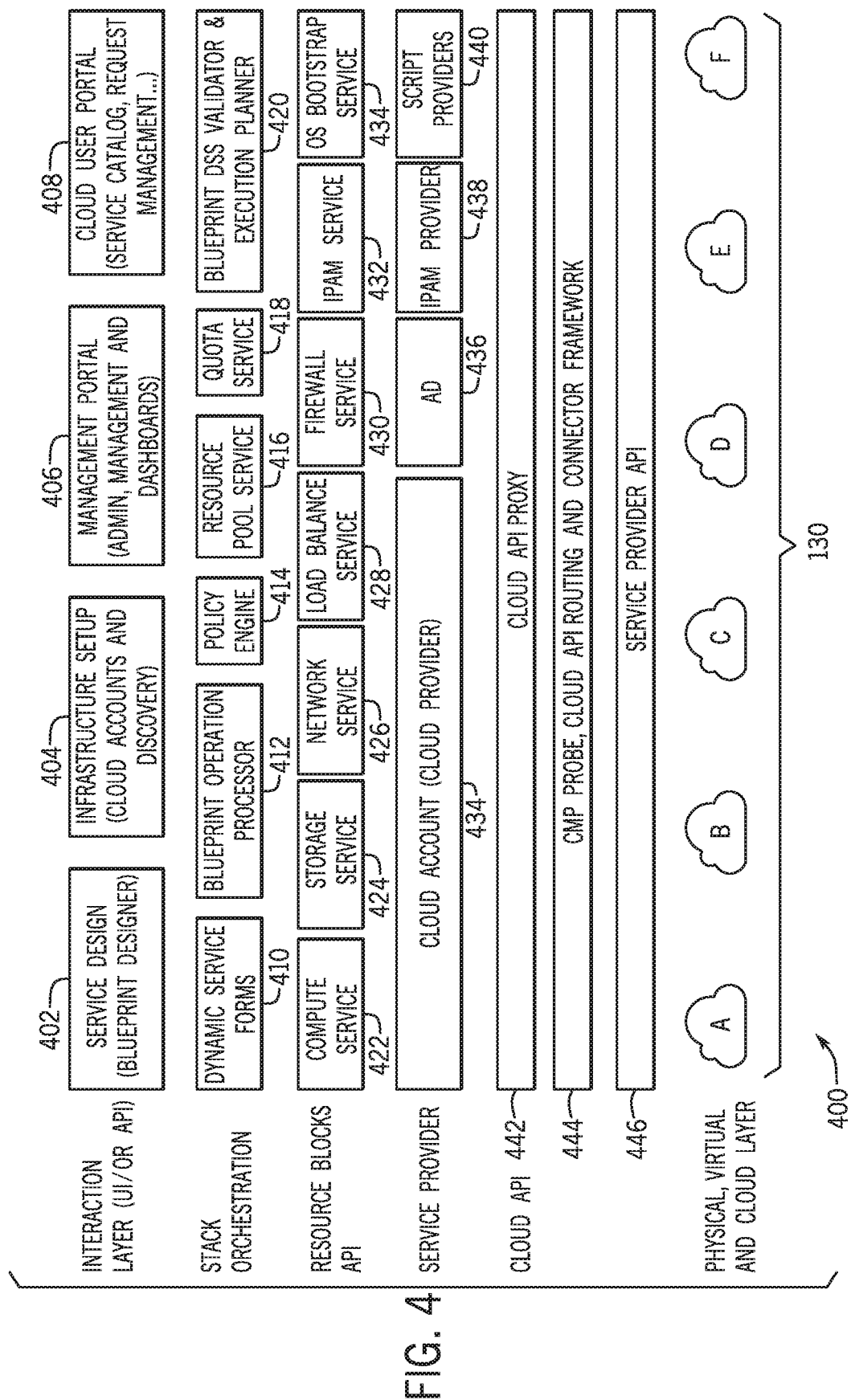
FIG. 4 is an architectural overview of a cloud management platform for managing the distributed computing system, in accordance with an embodiment.

FIG. 4 illustrates a CMP architectural overview of a CMP architecture 400. The CMP architecture 400 includes various interaction/interface layers. For example, the CMP architecture 400 also includes a a service design interface 402. The service design interface 402 enables service category managers/editors use to create and edit services. When the service design is complete, the managers/editors may publish it to create a catalog item that end users can request and/or use to request goods and/or services (e.g., laptop with a service agreement). An infrastructure setup interface 404 enables management/editing of a stored infrastructure for the service including discovery processes used to discover connected CIs 110. A management portal 406 is used to administrate, manage, and/or run reports on the services. A cloud user portal 408 enables users to request management perform actions, access the service catalog that is populated with services from the service designer.

The CMP architecture 400 also includes a stack orchestration including various services available for the platform 104. The CMP architecture 400 also includes dynamic service forms 410 that are used to add services from the catalog using a catalog item. The CMP architecture 400 also includes a blueprint operation processor 412 that is used to perform operations on/with the blueprint. The CMP architecture 400 includes a policy engine 414 that may be used to set rule on how, when, and/or how often to perform various operations. The CMP architecture 400 also includes a resource pool service 416 that enables pooling resources in the platform 104. The CMP architecture 400 also includes a quota service 416 that may be used to define a quota policy for different types of transactions. A transaction quota cancels any transaction in violation of the policy and notifies the user of the cancellation. The CMP architecture 400 also includes a blueprint validator 420. The blueprint validator 420 ensures that the blueprint is valid using one or more authentication schemes, such as Digital Signature Service (DSS). The blueprint validator 420 may also schedule execution of the blueprint.

Moreover, the CMP architecture 400 includes resource block APIs. The CMP architecture 400 includes a compute service 422 that may calculate information about a service level agreement (SLA) or other computations. The CMP architecture 400 also includes a storage service 424 that provides an ability to store data, manage data storage, change storage allocations, and/or other storage management operations. The CMP architecture 400 also includes a network service 426 that is used to run an Active Directory (AD). The CMP architecture 400 also includes a load balancing service 428 that balances loading between various resources in/connected to the platform 104. The CMP architecture 400 also includes a firewall service 430 that blocks unauthorized communications from outside of the platform 104. The CMP architecture 400 also includes an Internet Protocol Address Management (IPAM) service 432 that plans, tracks, and manages the IP address space used in the platform 104 by integrating Domain Name System (DNS) and Dynamic Host Configuration Protocol (DHCP) to ensure that duplicate addresses do not exist in the platform 104. The CMP architecture 400 also includes an Operating System (OS) bootstrap service 434 that causes the OS to startup on demand.

Furthermore, the CMP architecture 400 includes a cloud account identifier that identifies the cloud account 436 running one or more instances on the application server 107. The CMP architecture 400 also includes an AD service 438 that includes a variety of directory-based identity-related services. The CMP architecture 400 also includes an IPAM provider 438 that helps implement that IPAM service 432 across connected devices. The CMP architecture 400 may also include script providers 440 that include scripts that may be run in the platform 104.

As previously noted, communication between the platform 104 and the clouds 130 may utilize a CAPI 442 to enable CMP probing, routing, and connector frameworks 444. Using the CAPI 442, the platform may access/interact with the clouds 130 in a provider-agnostic and consistent manner.

Figure 5:
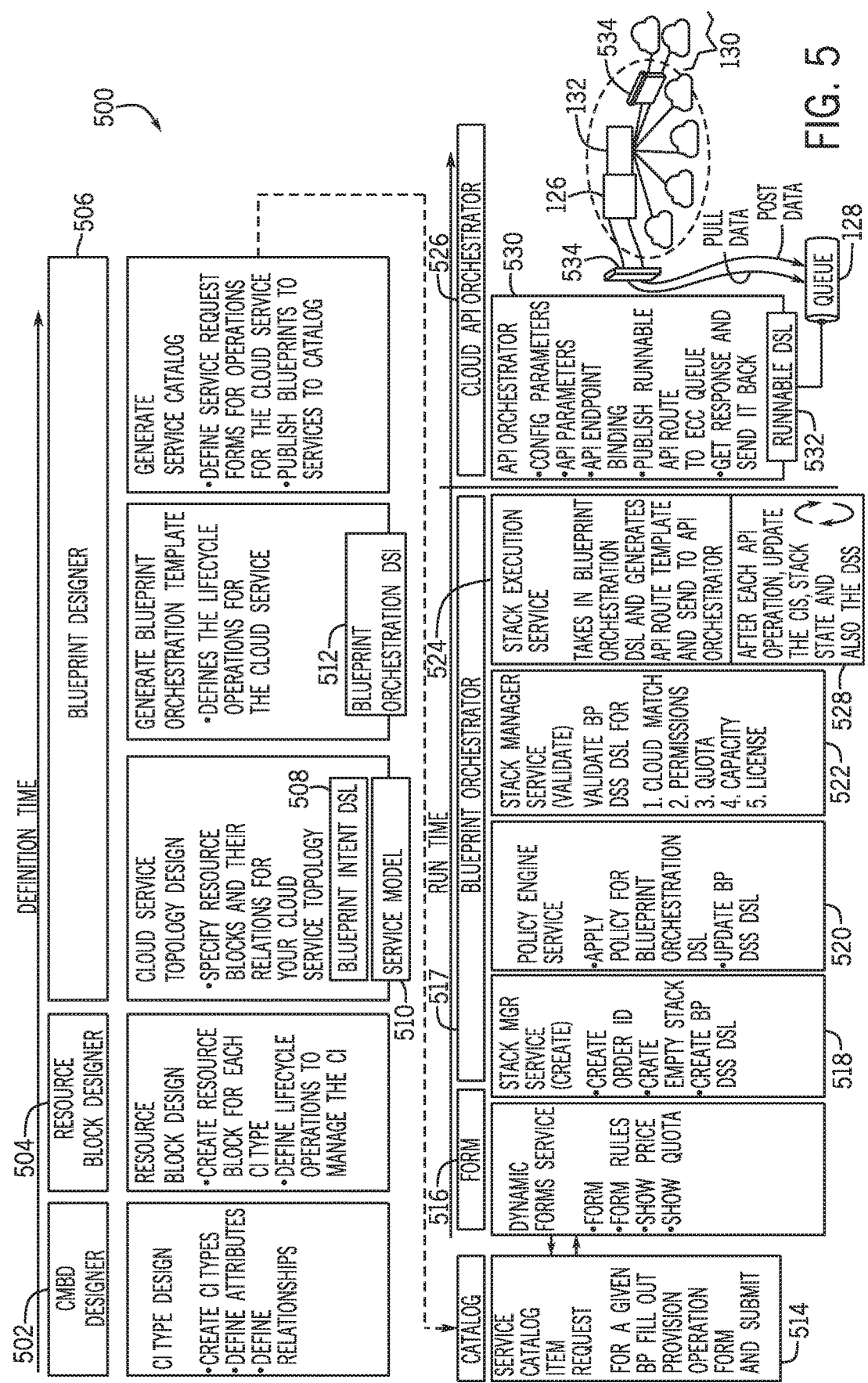
FIG. 5 is a flow diagram of a blueprint operation performing orchestration, in accordance with an embodiment.

FIG. 5 illustrates a flow of an example blueprint operation performing orchestration (i.e., automation) in the platform 104. Using the service design interface 402, a CMDB designer 502 is used to design a configuration item type by defining attributes and relationships for the CI types. A resource block designer 506 is used to create a resource block for each CI type and define lifecycle operations to manage the CI 110. A blueprint designer 508 is used to design a cloud service topology by specifying resource blocks and their relationships for the cloud service topology. The result of this specification results in a blueprint intent template in a domain-specific language (DSL) 510 and a service model 512 that may be used in service mapping and/or other service management operations. The blueprint intent template may illustrate the intent of the deployment in a graphical or data-oriented (e.g., YAML) format using existing resource blocks. The blueprint designer 508 also generates a blueprint orchestration template that defines the lifecycle operations for the cloud service into a blueprint orchestration DSL 512. Furthermore, the blueprint designer 506 also generates/adds to a service catalog that includes by adding one or more available goods and/or services to the service catalog. Generating the service catalog includes defining dynamic service forms 410 for operations for the cloud service and publishing blueprints to services for the catalog.

Later, at runtime, a service catalog item is requested 514 filling in one or more of the dynamic service forms 410. One of the forms of the dynamic service forms 410 is filled out of the specific blueprint as a provision operation form. The filling out and/or acting upon this form is governed by the form itself and/or form rules (block 516). The form may also show a price and a quota (to be added to quota service 418) in the form.

Also, at runtime, a blueprint orchestrator 517 (e.g., blueprint operation processor 412) is used to cause creation of a new stack manager service 518, application of policy 520, validation of the blueprint 522, and cause execution of a stack service 524. The stack manager service 518 creates an order identifier that identifies an order of operation of services, blueprints, and/or other operations. The stack manager service creates an empty stack and creates a blueprint DSS DSL. Application of policy 520 includes using the policy engine service 414 to apply policy for the blueprint orchestration DSL 512 and updating the blueprint DSS DSL. Validation of the blueprint includes validating the blueprint DSS DSL for cloud match, permissions, quota, capacity, and licensing. Execution of the stack service 524 includes taking the blueprint orchestration DSL and generating an API route template that is sent to CAPI orchestrator 526. In some embodiments, after each API operation is performed and/or sent to the CAPI orchestrator 526, the CIs 110, a stack state, and the DSS is updated 528.

The CAPI orchestrator 526 takes configuration parameters and API parameters and applies API endpoint bindings to generate a runnable API route and sends this API route DSL 532 back through the queue 128 to the MID server 126 (block 530). The connection between the MID server 126 and the CAPI orchestrator 526 may utilize a firewall 534. Similarly, connections between the MID server 126 via the CAPI probe 132 may utilize firewalls 534 in some embodiments.

CAPI provides an abstracted API interface from the different providers by calling the third-party APIs directly, stitching APIs, providing credential and/or access control, handling responses, handling errors, and/or providing debugging interfaces. Furthermore, CAPI framework provides an ability to define API end points to talk to third-party applications/systems in an agnostic manner, support for common tools (e.g., common enterprise integration patterns), an ability to invoke APIs based on standard interfaces, support API flow DSL, an ability to extend and configure the CAPI, support for dynamic stitching of APIs, support many transports, and/or expose endpoints as Uniform Resource Identifiers (URIs). In other words, the CAPI enables interaction with a wide variety of service providers used to provide clouds 130 in a way that isolates the users from differences in API implementation. For instance, an out-of-the-box API library may be included in the CAPI for commonly used cloud providers. However, this API library may be expanded/updated by users, management, and/or service providers.

Figure 6:
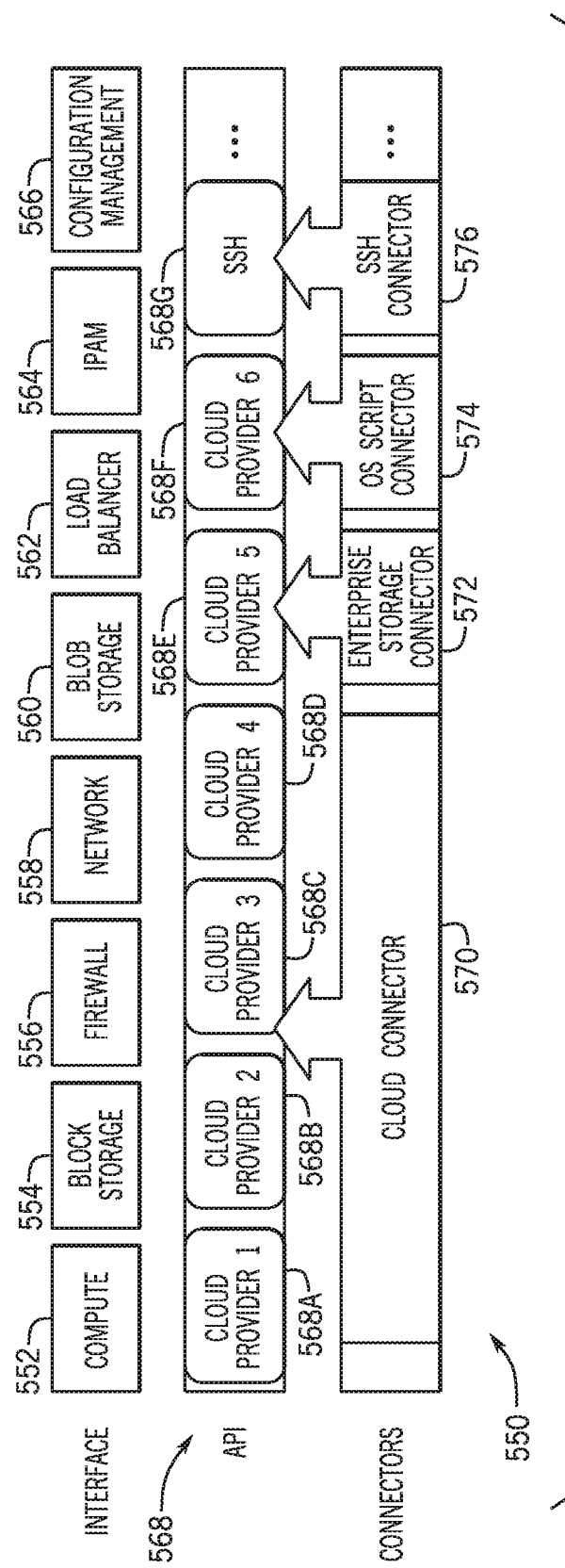
FIG. 6 is an architecture of an API used to utilize the cloud management platform of FIG. 4, in accordance with an embodiment.

FIG. 6 illustrates an architecture 550 of the CAPI. The CAPI architecture 550 includes one or more of the following interfaces: compute interface 552, block storage 554, firewall 556, network 558, blob storage 560, load balancer 562, IPAM 564, configuration management 566, and/or other interfaces. The compute interface 552 may be included in, interface with, and/or be similar to the compute service 422. The block storage 554 and blob storage 560 interfaces may be included in, interface with, and/or be similar to the storage service 424. The firewall 556 interface may be included in, interface with, and/or be similar to the firewall service 430. The network interface 558 may be included in, interface with, and/or be similar to the network service 426. The load balancer 562 interface may be included in, interface with, and/or be similar to the load balancer service 428. The IPAM 564 may be included in, interface with, and/or be similar to the IPAM service 432 and/or the IPAM provider 438. The configuration management interface 566 provides an interface to configure the CAPI. The interfaces are used to connect to APIs 568 for various cloud providers. The CAPI may handle API flow to the APIs 568, may validate inputs to the APIs 568, transform code from a provider-agnostic language to one used by the APIs 568, selecting a provider from the various providers, handling errors to/from the APIs 568 and the platform 104, and/or waiting. Selecting the provider may be guided by enterprise rules, such as price limits, preferred vendors, geographic locations of services offered by each vendor, whether vendor's datacenter is already used for similar services either to group services and/or diversify services, and/or other factors that may be used to determine which vendor to acquire goods and/or services from.

Furthermore, the CAPI may include a message filter that filters messages for an appropriate service provider, content-based flows, and/or logging of translations and/or other operations. To perform these operations, the CAPI may include connectors 570, 572, 574, and 576. The CAPI may include any number of connectors. One or more of the APIs may share a connector when sharing commonalities (e.g., common enterprise integration patterns). For example, connector 570 may provide an interface for cloud provider APIs 568A, 568B, 568C, and 568D. For example, API 568A may be used for AWS, API 568B may be used for Azure, API 568C may be used for VMWare, and API 568D may be used for OpenStack. Other connectors may be used for other providers. For example, an enterprise storage connector 572 may be used to interface API 568E (e.g., NetApp). An OS script connector 574 may be used to interface API 568F (e.g., VMWare View). SSH connector 576 may be used to interface an SSH driven cloud API 568G. Additionally or alternatively, other API interfaces may be provided in the CAPI.

Figure 7:
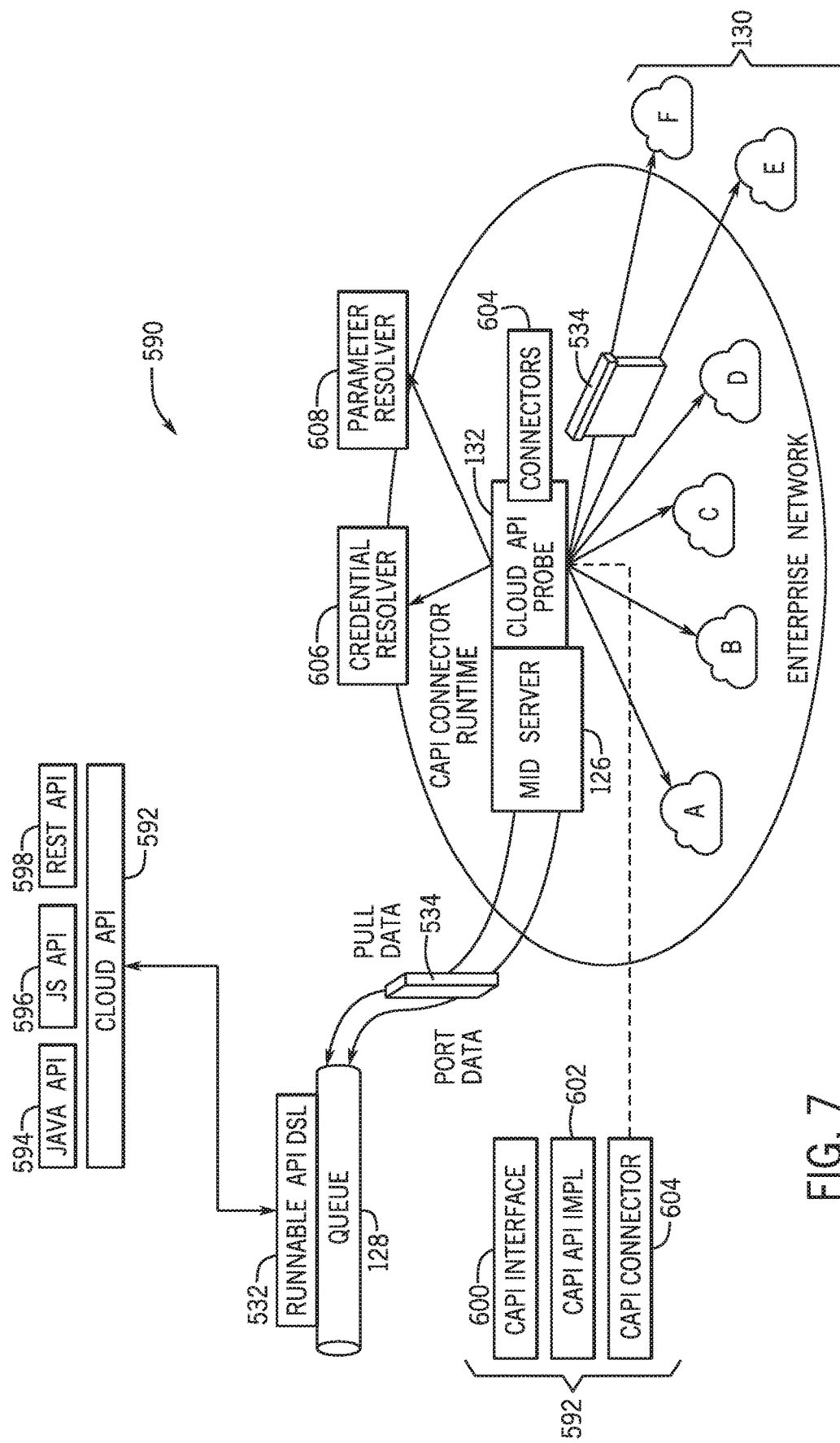
FIG. 7 illustrates a flow of the platform through the API of FIG. 6, in accordance with an embodiment.

FIG. 7 illustrates a flow 590 of the platform 104 through the CAPI 592 to the clouds 130. The CAPI 592 receives API functions 594, 596, and 598 from the platform 104. These APIs 594, 596, and 598 are illustrated as Java, Javascript, and REST APIs, respectively. However, in some embodiments, the APIs 594, 596, and 598 may include only a single API type at a time. In some embodiments, these APIs may be stitched together to form a single runnable DSL. Moreover, in some embodiments, the APIs 594, 596, and/or 598 be supplemented by and/or replaced by other suitable APIs types. The functions of the APIs 594, 596, and 598 are passed through a CAPI Interface 600. These functions are then passed through CAPI API implementation 602 that provides performs logic on communications through the CAPI interface 600 and/or the queue 128. For example, the CAPI API implementation 602 may utilize one or more processors to drive API orchestration by creating the runnable API DSL 532. The CAPI 592 also includes CAPI connectors 604 (e.g., connectors 568) that provide integration with third-party applications (e.g., the third-party APIs). The CAPI connector framework contains endpoints that can send and receive messages. In embodiments, the CAPI connector may generate skeleton sources and tests to create a new component to interact with a third-party system. Moreover, the CAPI connector may generate build scripts to build and test this new component.

The CAPI orchestrator also may utilize a credential resolver 606 to provide credentials specific to the cloud provider used for a particular cloud 130. The CAPI orchestrator may also utilize a parameter resolver 608 to convert parameters from a runnable API DSL 532 to a language used by the API of the specific provider for the particular cloud 130. This runnable API DSL 532 was passed from the CAPI 592 to the MID server 126 via the queue 128. In some embodiments, the credential resolver 606 and/or the parameter resolver 608 may be located in the CAPI probe 132.

The CAPI 592 may return an output to a calling layer. Moreover, in some embodiments, the CAPI 592 may translate a response from the clouds 130 and/or the MID server 126.

The CAPI probe 132 may run on the MID server 126 and decode a payload for an incoming message from the clouds 130. Furthermore, the CAPI probe 132 may execute messages using an API executor and obtains API responses from the clouds 130 and returns them to the CAPI 592 via the queue 128.

Figure 8:
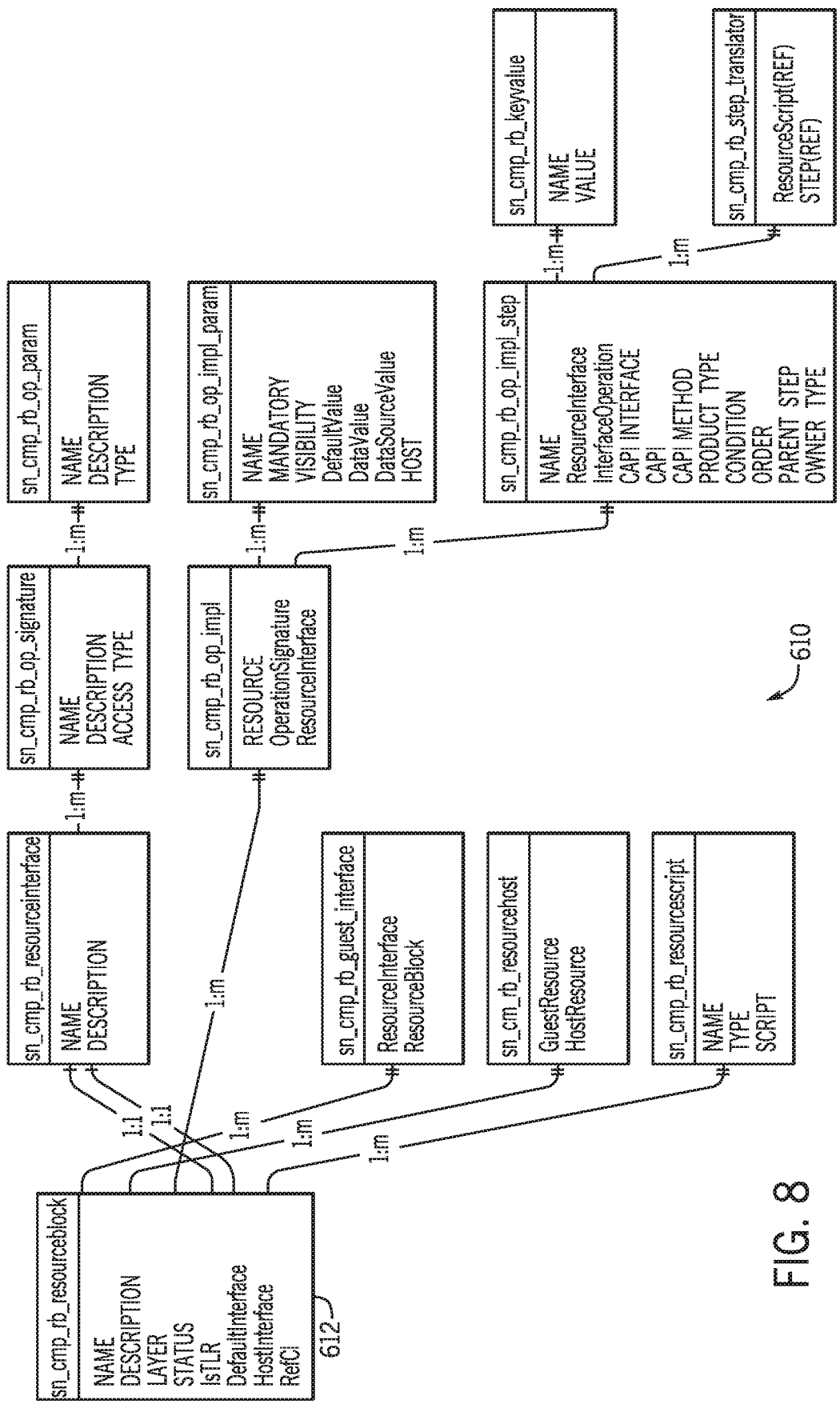
FIG. 8 illustrates a resource block table utilized in the flow of FIG. 7, in accordance with an embodiment.
Figure 9:
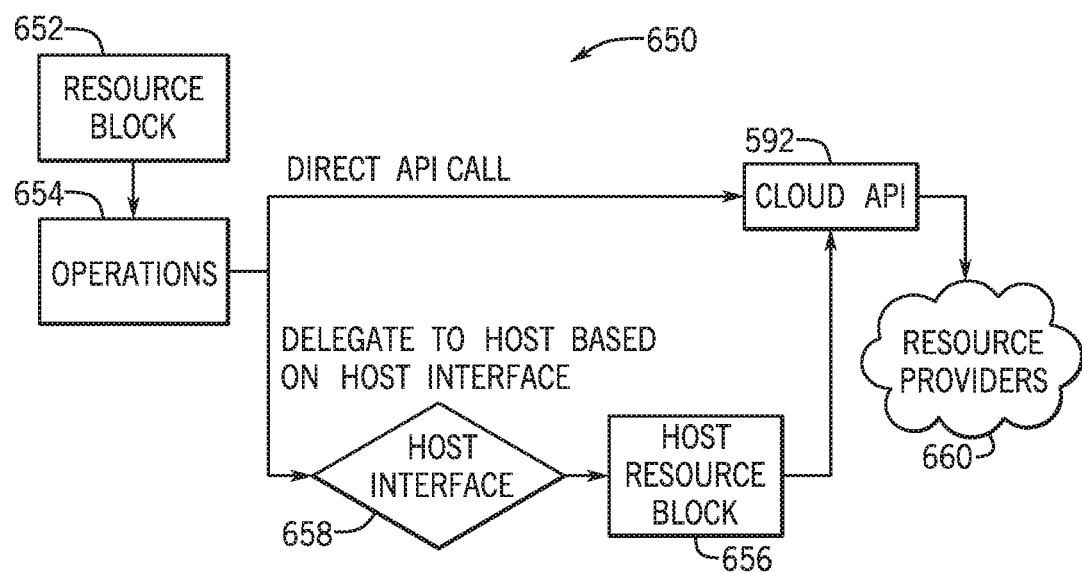
FIG. 9 illustrates a communication process for delegating actions, in accordance with an embodiment.

As previously noted, resource blocks are the basic building block of blueprints. Each resource block is tied to a CMDB CI type, and the resource block behaviors are implemented as operations. These operations may be exposed through guest interfaces. Each resource block can sit on any other resource block which matches its host interface. Each resource block can have a set of other resource blocks that can be hosts for the respective resource block. Blueprint wiring between resource blocks may be driven/validated using this principle. For example, an example resource block table structure 610 for a resource block 612 is illustrated in FIG. 8. Operations provide the behavior of the resource block. A resource block can implement multiple guest interfaces. Each of the interfaces have their own operations. Operation invocations may have their interface specified. Moreover, each resource block may have a host interface. In some embodiments, only those resources that implement this host interface can become hosts for this resource block. The resource block operation can communicate to external systems (e.g., clouds 130) by directly calling CAPI and/or delegating to a host via a host interface call. The delegation communication method enables late binding. FIG. 9 illustrates this communication process 650. A resource block 652 has an operation 654 that defines its behavior. Via the operation 654, the resource block 652 may directly call the CAPI 592. Additionally or alternatively, the operation 654 may delegate such calls to its host resource block 656 based on its host interface 658. The host resource block 656 then sends the delegated call to the CAPI 592. The CAPI 592 used the API call to communicate with resource providers 660 (e.g., clouds 130) similar to those steps discussed above.

As previously noted, a blueprint is a deployment definition of cloud service model (including workloads). Workload consists of various interconnected resources. The blueprint is a template for creating workloads consistently across clouds. The blueprint has set of operations which takes inputs and orchestrates the deployment. The blueprints interact with resources and CIs 110. The blue prints use the operations defined in the resource blocks to build an automation flow. When a resource operation is executed, a CI is written back as per the association of the resource block and the CI type. For example, a Cloud Model API Service may be used to write the data back to the CI as well to the stack associated metadata. In some cased, much of the cloud infrastructure resources are common across the various clouds. Thus, the CMP may support same blueprints to be deployed across different clouds. The system will use resource block hosts and service model constraints to figure out the proper hosts.

A resource on a blueprint can have multiple possible hosts. Thus, host resolution may be performed as follows: any given resource can have a set of hosts based on the host interface, service model "constraints" may identify the host, the guest interface may be deployed on the host interface and constraints indicate which hosts are applicable, and/or a designer may restrict hosts using restriction expressions. For example, a designer may enter "in (AWS Datacenter, vSphere Datacenter)" to restrict hosts to AWS or vSphere.

Each blueprint has a set of operations that by default are created with it. When a resource block is connected to a host resource, CMP automatically associates the resource operation automatically. For example, assume that a virtual server is connected to a first cloud service provider (e.g., AWS Datacenter). CMP may automatically add the virtual server's provision operation to blueprint's provision operation. Moreover, in some embodiments, CMP may also automatically add the virtual server's stop, start and other operations as well to the blueprint's respective operations. Each blueprint operation type may be bottom up or top down. Some operations, like the provision operation or start operation, may process (e.g., provision) the bottommost resources first and then process toward the top. For example, a virtual machine would be provisioned before provisioning server software (e.g., Apache).

Some operations, such as a deprovision operation or stop operations, process (e.g., deprovision) top resources first and then moves down to process the remaining resources. For example, server software (e.g., Apache) is deprovisioned before deprovisioning a virtual machine on which the software runs. CMP will determine this approach and add the resource steps automatically thereby potentially saving time and/or costs to the company and/or the designer.

Figure 10:
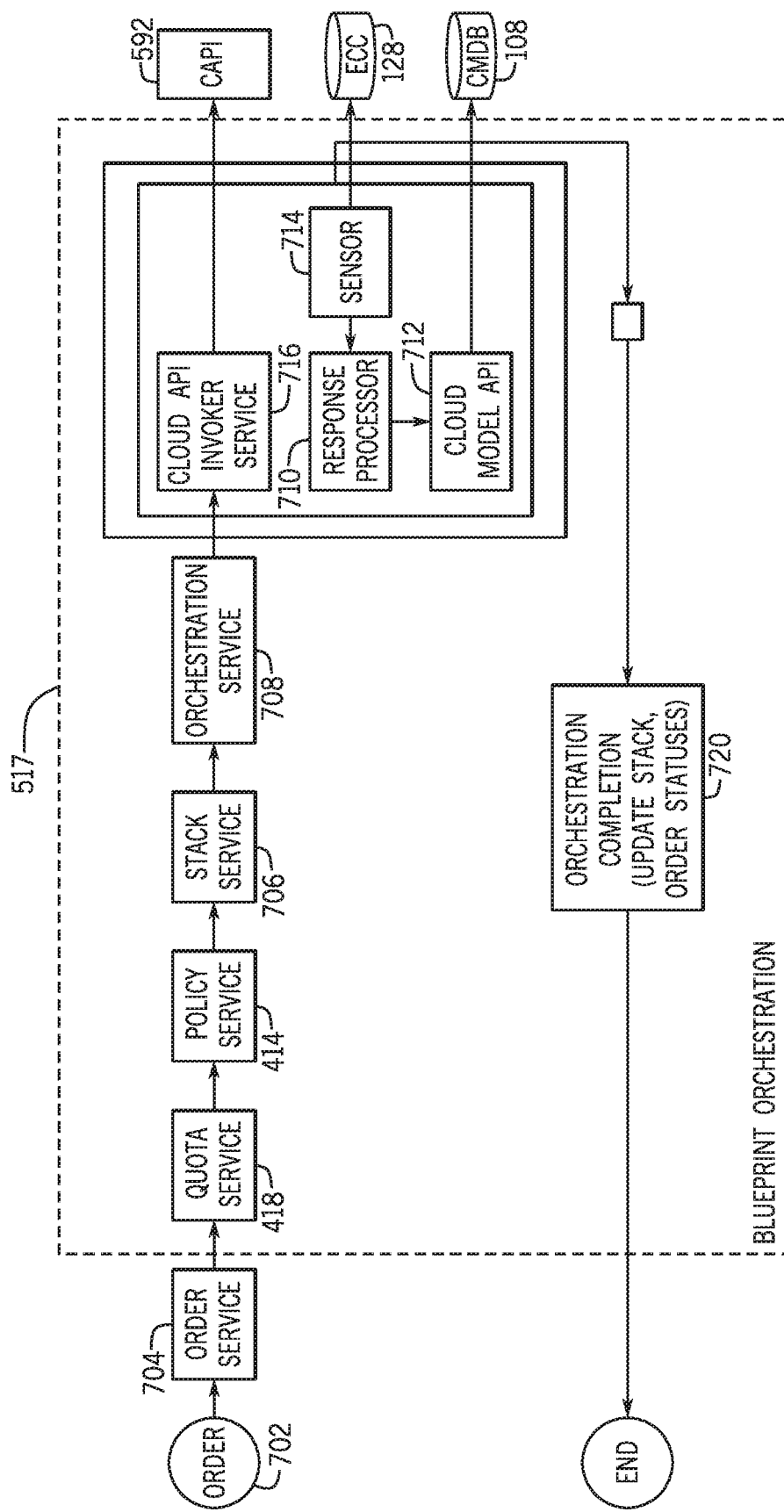
FIG. 10 illustrates a process for blueprint orchestration, in accordance with an embodiment.

FIG. 10 illustrates a process 700 for blueprint orchestration. When a blueprint operation is invoked, the blueprint orchestrator service 517 is called. An order 702 may be created in an order service 704. Responsive to the order creation, blueprint operation will invoke policies, check quota, and a stack service 706 is called. Then the orchestration service 708 determines which resource operations that are be invoked. The blueprint orchestration service 517 performs a depth-first on the resource operation to figure out the list of CAPI 592 calls using a response processor 710, cloud model API 712, and probe sensors 714. For each of the CAPI 592 calls, the blueprint orchestration service 517 will invoke the CAPI 592 using a CAPI invoker service 716. When all the calls are completed, the orchestration service updates the status of the order and the stack with an orchestration complete message 720.

Figure 11:
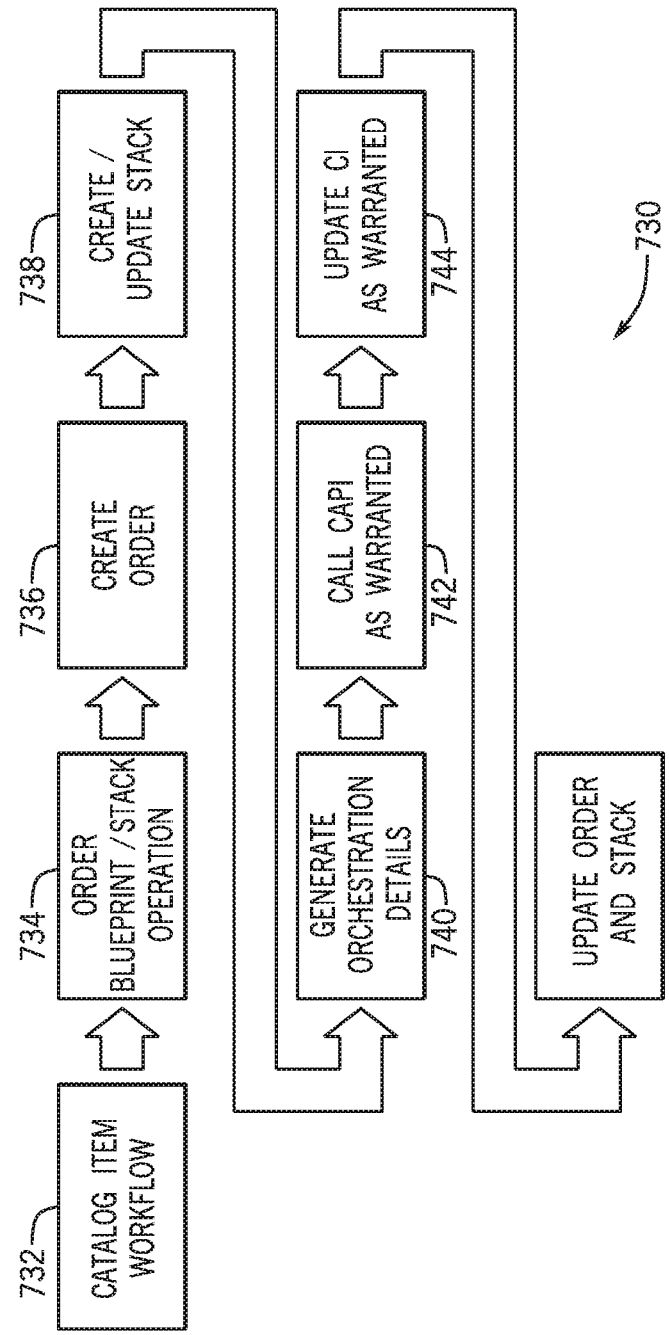
FIG. 11 illustrates a process for controlling a stack and order, in accordance with an embodiment.

FIG. 11 illustrates a process 730 for controlling a stack and order. When a catalog item is accessed, the catalog item may utilize a workflow 732. For example, the catalog item may be an item in a service catalog used to order goods and/or services (e.g., a laptop with a service agreement). The catalog item workflow 732, in turn, calls the order service and stack operation 734 (e.g., order service 704). The order service and stack operation 734 creates an order 736 and triggers the blueprint orchestration 517 and creates/updates a stack 738. The blueprint orchestration 517 generates orchestration details 740 and returns back an order identifier while calling 742 CAPI 592 when warranted and updating 744 CIs 110 when warranted. The blueprint orchestration 517 invokes policies and checks quotas, as previously discussed. The blueprint orchestration 517 eventually completes and updates the status of the stack and order 746. Control then returns back to the catalog item workflow 732.

Figure 12:
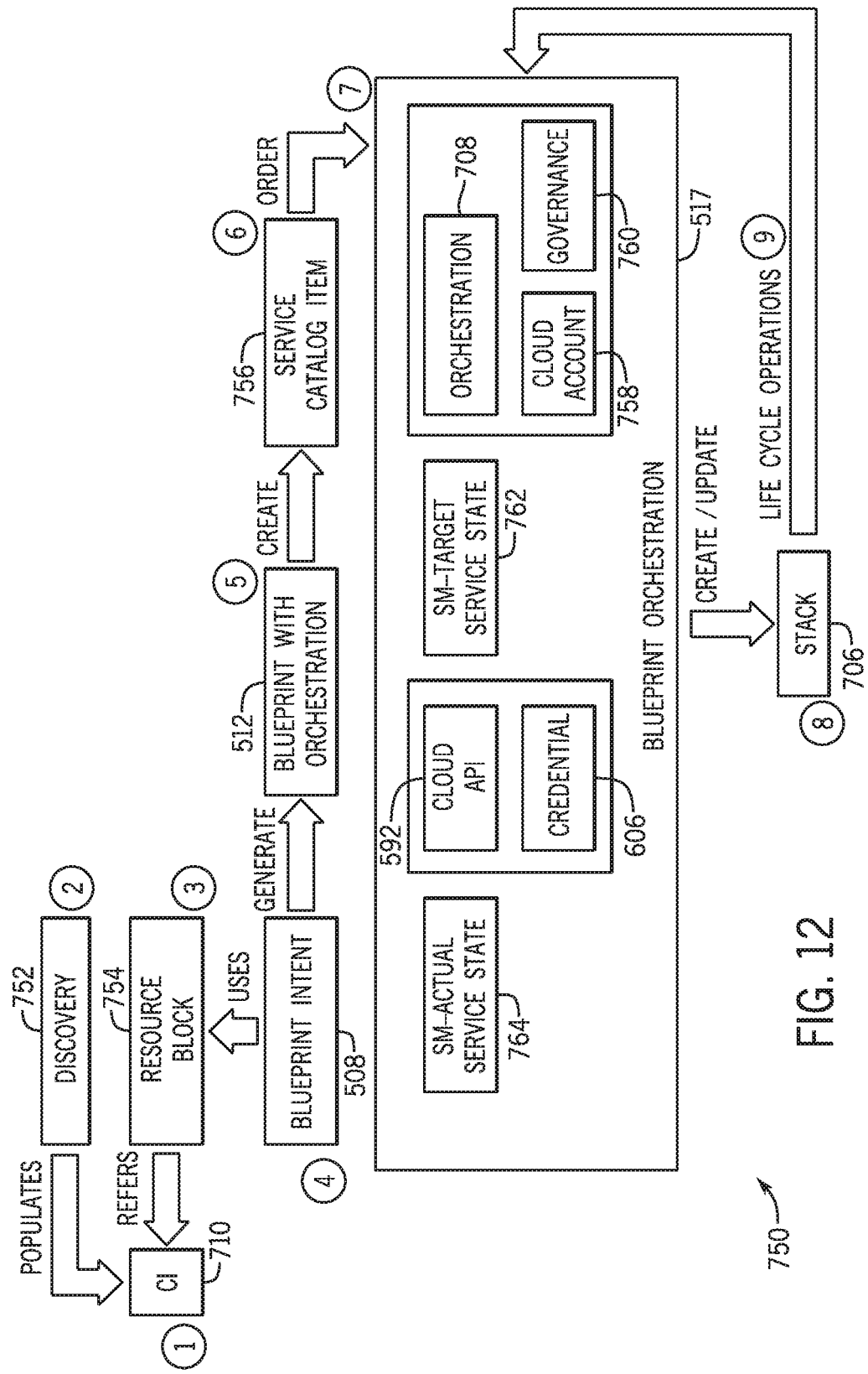
FIG. 12 illustrates a process for ordering a good or service utilizing a service catalog, in accordance with an embodiment.

FIG. 12 provides a summary over the process 750 reflecting relationships between various components of the system 10. A CI 110 is populated into a CMDB 107 using discovery 752. A resource block 754 then references the CI 110. The resource block is used in a blueprint intent 508 in a data-oriented language (e.g., YAML). The blueprint intent 508 is used to generate a blueprint with orchestration DSL 512. The blueprint with orchestration DSL 512 is used to create a service catalog item 756. The service catalog item 756 is used to order the service from the service catalog and run the blueprint orchestration 517. For example, the service (e.g., leasing a server rack) may be ordered through a specific vendor based on enterprise rules, such as price. The blueprint orchestration 517 utilizes the orchestration service 708, cloud account 758, governance rules 760, CAPI 592, credential resolver 606, service model target service stage 762, and/or service model actual service state 764 to create/update a stack service 706. The governance rules 760 may include rules used to choose a vendor for the service when the order does not include an indication of a vendor. If the order indicates a vendor, the indicated vendor used. This stack service 706 once created may also be used by the blueprint orchestration 517 to perform future updates to the stack service 706. Furthermore, the blueprints used by the blueprint orchestrator may be vendor agnostic with connections used to convert the vendor-agnostic language to a language suitable for a target vendor. The language suitable for the target vendor is used to acquire at least a portion of the good and/or services from the vendor.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   one or more processors; and
   memory storing instructions configures to cause the one or more processors to
      perform a discovery operation on previously deployed services to discover multi-cloud environments comprising public clouds and private clouds, wherein discovery of the public clouds is performed using a single cloud application programming interface (API) that serves as an interface for both public and private clouds to discover the public and private clouds, wherein the public clouds are provided by a plurality of vendors, and wherein the private clouds are hosted by and accessible to an organization that uses the private clouds;
      identify relationships between configuration items deployed in the public clouds and configuration items deployed in the private clouds using the discovery operation on the multi-cloud environments;
      build a service model using the identified relationships;
      provide a service map based at least in part on the service model, wherein the service map indicates the identified relationships, wherein the service map indicates a cloud service topology showing the configuration items as resource blocks with the identified relationships mapped therebetween, wherein each of the resource blocks corresponds to a respective type of the configuration items, wherein each of the resource blocks defines lifecycle operations of the respective type of the configuration items, and wherein the lifecycle operations comprise tracking and managing a lifecycle of the respective type of the configuration items; and
      perform a service management operation on the multi-cloud environments using the service model.

2. The system of claim 1 wherein discovering the multi-cloud environments comprises discovering data center configuration items in a data center, and wherein identifying relationships comprises identifying relationships between configuration items in the multi-cloud environment and the data center configuration items.

3. The system of claim 1, wherein the service map comprises an indication of the identified relationships, and wherein providing the service map comprises providing indications of the configuration items on the service map.

4. The system of claim 1, wherein configuration items in the private clouds or configuration items in the public clouds comprise one or more of: a server computing device, a client computing device, a processor, memory, a storage device, a networking device, a power supply, application software, firmware, a virtual machine, a virtual storage device, a data file, a data directory, a printer, a router, a load balancer, a data center, a database, a fuel tank, power equipment, a heating unit, a venting unit, or an air conditioning unit.

5. The system of claim 1, wherein the single cloud API interfaces with the public and private clouds using vendor-specific APIs.

6. A tangible, non-transitory, and computer-readable medium having instructions stored thereon that, when executed, are configured to cause one or more processors to:
   interact with a single cloud application programming interface (API);
   discover previously deployed services as configuration items using a discovery operation performed on multi-cloud environments comprising public clouds and private clouds, wherein discovery of the private clouds uses the single cloud API that serves as an interface for both public and private clouds to discover the public and private clouds, wherein the public clouds are provided by a plurality of vendors, and wherein the private clouds are hosted by and accessible to an organization that uses the private clouds;
   identify relationships between the deployed configuration items in the public clouds and deployed configuration items in the private clouds based at least in part on the discovery operation performed on the multi-cloud environments;

build a service model using the identified relationships;

provide a service map based at least in part on the service model, wherein the service map indicates the identified relationships, wherein the service map shows a cloud service topology showing the configuration items as resource blocks with the identified relationships mapped therebetween, wherein each of the resource blocks corresponds to a respective type of the configuration items, wherein each of the resource blocks defines lifecycle operations of the respective type of the configuration items, and wherein the lifecycle operations comprise tracking and managing a lifecycle of the respective type of the configuration items; and perform a service management operation on the multi-cloud environments using the service model.

7. The tangible, non-transitory, and computer-readable medium of claim 6, wherein the single cloud API is agnostic to which vendor of a plurality of vendors is used for a configuration item in the public or private clouds.

8. The tangible, non-transitory, and computer-readable medium of claim 7, herein the instructions, when executed, are configured to cause the one or more processors to translate a blueprint to a format suitable for a selected vendor using the single cloud API utilizing one or more connectors to map blueprint actions to a vendor-specific format.

9. The tangible, non-transitory, and computer-readable medium of claim 6, wherein the instructions, when executed, are configured to cause the one or more processors to map the configuration items using the service model.

10. The tangible, non-transitory, and computer-readable medium of claim 9, wherein configuration items in the private clouds or configuration items in the public clouds comprises one or more of: a server computing device, a client computing device, a processor, memory, a storage device, a networking device, a power supply, application software, firmware, a virtual machine, a virtual storage device, a data file, a data directory, a printer, a router, a load balancer, a data center, a database, a fuel tank, power equipment, a heating unit, a venting unit, or an air conditioning unit.

11. A method, comprising:

interacting with a single cloud application programming interface (API);

discovering multi-cloud environments using a discovery operation, wherein the multi-cloud environments comprise public clouds and private clouds, wherein discovery of the public clouds comprises using the single cloud API that serves as an interface for both public and private clouds to discover the public and private clouds, wherein the public clouds are provided by a plurality of vendors, and wherein the private clouds are hosted by and accessible to an organization that uses the private clouds;

identifying relationships between deployed configuration items in the public clouds and deployed configuration items in the private clouds based at least on the discovery operation performed on the multi-cloud environments;

building a service model using the identified relationships;

providing a service map based at least in part on the service model, wherein the service map indicates the identified relationships, wherein the service map shows a cloud service topology showing the configuration items as resource blocks with the identified relationships mapped therebetween, wherein each of the resource blocks corresponds to a respective type of the configuration items, wherein each of the resource blocks defines lifecycle operations of the respective type of the configuration items, and wherein the lifecycle operations comprise tracking and managing a lifecycle of the respective type of the configuration items; and performing a service management operation in the multi-cloud environments using the service model.

12. The method of claim 11, comprising discovering a data center, and wherein identifying relationships comprises identifying relationships in the multi-cloud environments and the data center.

13. The method of claim 11, comprising mapping components in the public clouds and the private clouds, and wherein providing the service map comprises providing the mapped components on the service map.

14. The method of claim 13, wherein the mapped components comprise one or more of: a configuration item comprising a server computing device, a client computing device, a processor, memory, a storage device, a networking device, a power supply, application software, firmware, a virtual machine, a virtual storage device, a data file, a data directory, a printer, a router, a load balancer, a data center, a database, a fuel tank, power equipment, a heating unit, a venting unit, or an air conditioning unit.

15. The method of claim 11, wherein the single cloud API interfaces with the public and private clouds using vendor-specific APIs.

16. The method of claim 11, comprising:

receiving an indication of a service to be added to the service map without an explicit identification of a selected vendor;

selecting a vendor from a plurality of vendors based on an enterprise rule; and establishing a relationship with the service to be added for the selected vendor using the single cloud API.

17. The method of claim 16, wherein establishing a relationship with the service comprises creating an entry in a configuration management database (CMDB).

18. The method of claim 16, wherein the enterprise rule comprises selecting the service based at least in part on a lowest price for the service from the plurality of vendors.

19. The method of claim 11, wherein the discovery operation comprises:

sending discovery probes to the configuration items to undergo the discovery operation;

receiving probe results from the configuration items that undergo the discovery operation; and updating entries in a configuration management database (CMDB) using the probe results.

20. The method of claim 11, wherein the discovery operation comprises:

generating, using a cloud API orchestrator, runnable API routes for each of the public clouds, wherein the runnable API routes define API end points to talk to the public clouds agnostic of vendors providing the public clouds;

sending, from the cloud API orchestrator, the runnable API routes to a discovery server;

receiving, at the cloud API orchestrator and from the discovery server, a request to run discovery against the public clouds;

sending, from the cloud API orchestrator to the public clouds, cloud API probes along respective runnable API routes;

receiving, at the cloud API orchestrator from the public clouds, responses to the cloud API probes; and forwarding, from the cloud API orchestrator to the discovery server, at least a portion of the responses to the cloud API probes.

* * * * *